United States Patent
Adachi

(10) Patent No.: US 9,495,624 B2
(45) Date of Patent: Nov. 15, 2016

(54) ESTIMATION APPARATUS

(71) Applicant: FUJI XEROX CO., LTD., Tokyo (JP)

(72) Inventor: Koji Adachi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/841,986

(22) Filed: Sep. 1, 2015

(65) Prior Publication Data

US 2016/0232435 A1    Aug. 11, 2016

(30) Foreign Application Priority Data

Feb. 9, 2015 (JP) ................................. 2015-023122

(51) Int. Cl.
*H04N 1/04* (2006.01)
*G06K 15/00* (2006.01)

(52) U.S. Cl.
CPC ......... *G06K 15/408* (2013.01); *G06K 15/4065* (2013.01)

(58) Field of Classification Search
CPC ........................... G06K 15/408; G06K 15/4065
USPC .................. 358/1.12, 1.9, 1.15, 474
See application file for complete search history.

(56) References Cited

U.S. PATENT DOCUMENTS

2015/0091238 A1* 4/2015 Hatakeyama ............ B65H 7/06
271/3.16

FOREIGN PATENT DOCUMENTS

JP    2010-210801 A    9/2010
JP    2014-069362 A    4/2014

* cited by examiner

*Primary Examiner* — Houshang Safaipour
(74) *Attorney, Agent, or Firm* — Oliff PLC

(57) ABSTRACT

Provided is an estimation apparatus including a storage unit that stores an estimation model for estimating transport failure information pertaining to a transport failure based on information pertaining to a transit time in which each of plural papers with different characteristics passes through a certain transport section in a transport path and information pertaining to a utilization of each of the plural papers for each of plural image processing apparatuses, an acquisition unit that acquires the characteristics of the paper, information pertaining to the transit time of the paper, and information pertaining to the utilization of the paper for the image processing apparatus that is the estimation target, and an estimation unit that estimates the transport failure information using the estimation model based on the acquisition results of the acquisition unit.

8 Claims, 15 Drawing Sheets

| ACQUISITION DATE AND TIME | APPARATUS INFORMATION ||| PAPER CHARACTERISTIC INFORMATION |||| FIRST TRANSIT TIME ||
|---|---|---|---|---|---|---|---|---|---|
| | MODEL INFORMATION | APPARATUS ID | ACCOMMODATION UNIT INFORMATION | TYPE OF PAPER | BASIS WEIGHT [g/m²] | SIZE [mm²] | OVERPRINTING | SENSOR S1(ms) | SENSOR S2(ms) |
| 5/10/2013 10:09 | A01 | 10001 | ACCOMMODATION UNIT Y1 | ORDINARY PAPER | 81 | 14167000 | N | 650 | 815 |
| 5/10/2013 10:09 | A01 | 10001 | ACCOMMODATION UNIT Y1 | ORDINARY PAPER | 81 | 14167000 | N | 647 | 809 |
| 5/10/2013 10:09 | A01 | 10001 | ACCOMMODATION UNIT Y1 | ORDINARY PAPER | 81 | 14167000 | N | 652 | 813 |
| 5/10/2013 10:09 | A01 | 10001 | ACCOMMODATION UNIT Y1 | ORDINARY PAPER | 81 | 14167000 | N | 651 | 810 |
| 5/10/2013 10:09 | A01 | 10001 | ACCOMMODATION UNIT Y1 | ORDINARY PAPER | 81 | 14167000 | N | 646 | 809 |
| 5/10/2013 10:09 | A01 | 10001 | ACCOMMODATION UNIT Y1 | ORDINARY PAPER | 81 | 14167000 | N | 650 | 813 |
| 5/10/2013 10:09 | A01 | 10001 | ACCOMMODATION UNIT Y1 | ORDINARY PAPER | 81 | 14167000 | N | 649 | 812 |
| 5/10/2013 10:09 | A01 | 10001 | ACCOMMODATION UNIT Y1 | ORDINARY PAPER | 81 | 14167000 | N | 645 | 807 |
| ... | ... | ... | ... | ... | ... | ... | ... | ... | ... |

| ACQUISITION DATE AND TIME | PAPER CHARACTERISTIC INFORMATION | TRANSPORT STATE CHARACTERISTIC AMOUNT | | | | | UTILIZATION INFORMATION | |
|---|---|---|---|---|---|---|---|---|
| | TYPE OF PAPER | SENSOR S1 FIRST TRANSIT TIME | | SENSOR S1 TO SENSOR S2 SECOND TRANSIT TIME | | ... | SWITCHING FREQUENCY [NUMBER OF TIMES /1000 PAPER] | OVERPRINTING FREQUENCY [NUMBER OF PAPER /1000 PAPER] |
| | | AVERAGE VALUE [ms] | √DISPERSION VALUE | AVERAGE VALUE [ms] | √DISPERSION VALUE | | | |
| 5/7/2013 8:10 | ORDINARY PAPER | 647.93 | 2.435 | 154.6 | 1.497 | ... | 0.55 | 0.1 |
| 5/7/2013 16:45 | COATED PAPER | 641.27 | 2.567 | 153.8 | 1.566 | ... | 0.55 | 0.1 |
| 5/8/2013 14:12 | COATED PAPER | 639.89 | 2.832 | 158.3 | 1.953 | ... | 0.45 | 0.15 |
| 5/9/2013 11:12 | ORDINARY PAPER | 650.87 | 5.287 | 156.6 | 3.959 | ... | 0.6 | 0.15 |
| 5/9/2013 16:41 | ORDINARY PAPER | 646.61 | 7.336 | 160.4 | 2.693 | ... | 0.6 | 0.15 |
| 5/14/2013 9:50 | COATED PAPER | 648.39 | 4.562 | 156.9 | 2.224 | ... | 0.7 | 0.1 |
| 5/14/2013 13:22 | COATED PAPER | 646.33 | 3.923 | 157.4 | 1.885 | ... | 0.7 | 0.1 |
| 5/14/2013 15:33 | COATED PAPER | 643.21 | 2.891 | 157.2 | 3.213 | ... | 0.7 | 0.1 |
| ... | ... | ... | ... | ... | ... | ... | ... | ... |

FIG. 9

| ACQUISITION DATE AND TIME | APPARATUS INFORMATION | | FAILURE CLASSIFICATION INFORMATION | DETECTION SENSOR INFORMATION |
|---|---|---|---|---|
| | MODEL INFORMATION | APPARATUS ID | | |
| 5/10/2013 10:09 | A01 | 10001 | MISFEED | S1 |
| 5/21/2013 13:39 | A01 | 10002 | MULTIPLE FEED | J1 |
| 6/11/2013 15:22 | A01 | 10003 | JAM | S2 |
| ... | ... | ... | ... | ... |

314

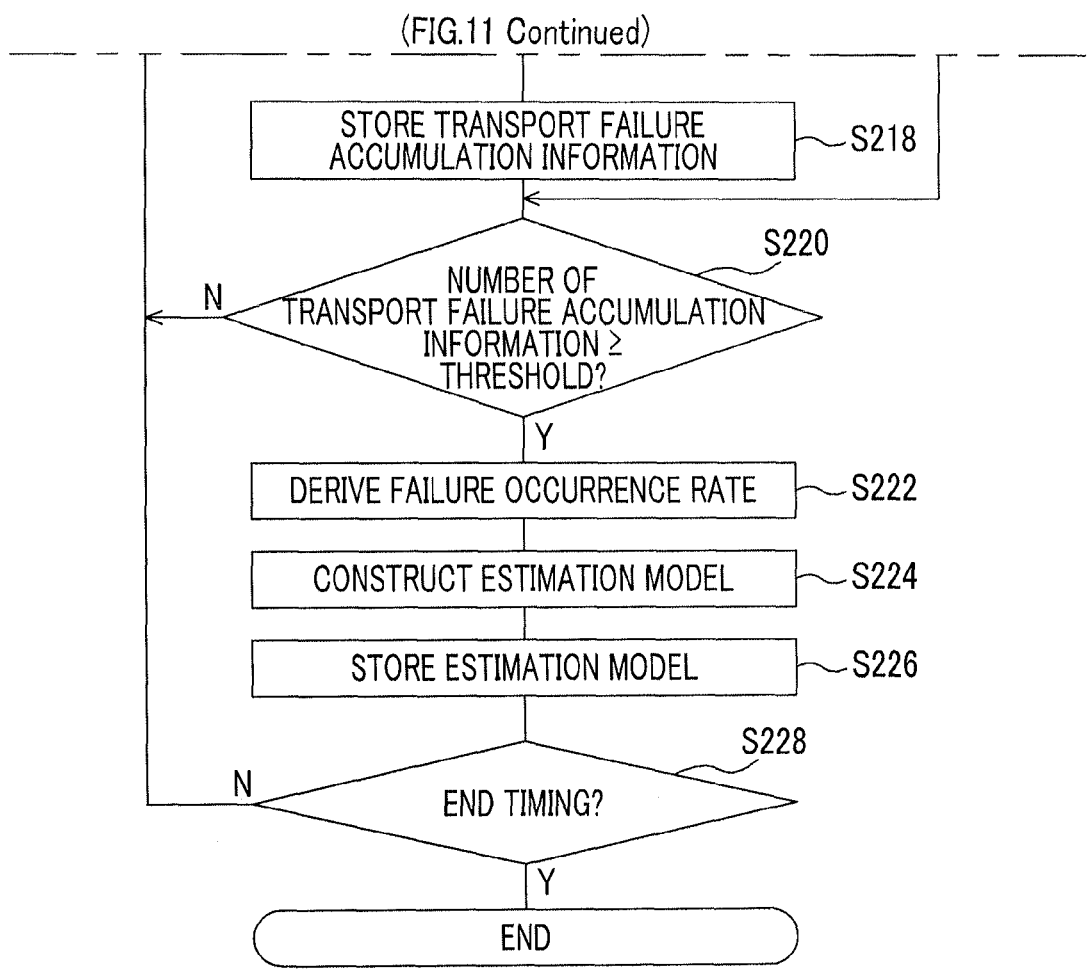

ESTIMATION APPARATUS

CROSS-REFERENCE TO RELATED APPLICATIONS

This application is based on and claims priority under 35 USC 119 from Japanese Patent Application No. 2015-023122 filed Feb. 9, 2015.

BACKGROUND

Technical Field

The present invention relates to an estimation apparatus.

SUMMARY

According to an aspect of the invention, there is provided an estimation apparatus including:

a storage unit that stores an estimation model for estimating transport failure information pertaining to a transport failure based on information pertaining to a transit time in which each of plural papers with different characteristics passes through a certain transport section in a transport path and information pertaining to a utilization of each of the plural papers for each of plural image processing apparatuses;

an acquisition unit that acquires the characteristics of the paper, information pertaining to the transit time of the paper, and information pertaining to the utilization of the paper for the image processing apparatus that is the estimation target; and an estimation unit that estimates the transport failure information using the estimation model based on the acquisition results of the acquisition unit.

BRIEF DESCRIPTION OF THE DRAWINGS

Exemplary embodiments of the present invention will be described in detail based on the following figures, wherein:

FIG. 7 is a schematic view showing an example of the paper transport information according to the exemplary embodiment;

FIG. 8 is a schematic view showing an example of the analysis information according to the exemplary embodiment;

FIG. 9 is a schematic view showing an example of the transport failure accumulation information according to the exemplary embodiment;

DETAILED DESCRIPTION

Below, exemplary embodiments for achieving the invention are described in detail with reference to the drawings. Here, an exemplary embodiment applied to an estimation system, in which plural image forming apparatuses and one estimation apparatus are connected via a communication line, and that integrally manages each image forming apparatus with the estimation apparatus, is described.

First, the configuration of an estimation system 300 according to the exemplary embodiment will be described with reference to FIG. 1.

Figure 1:
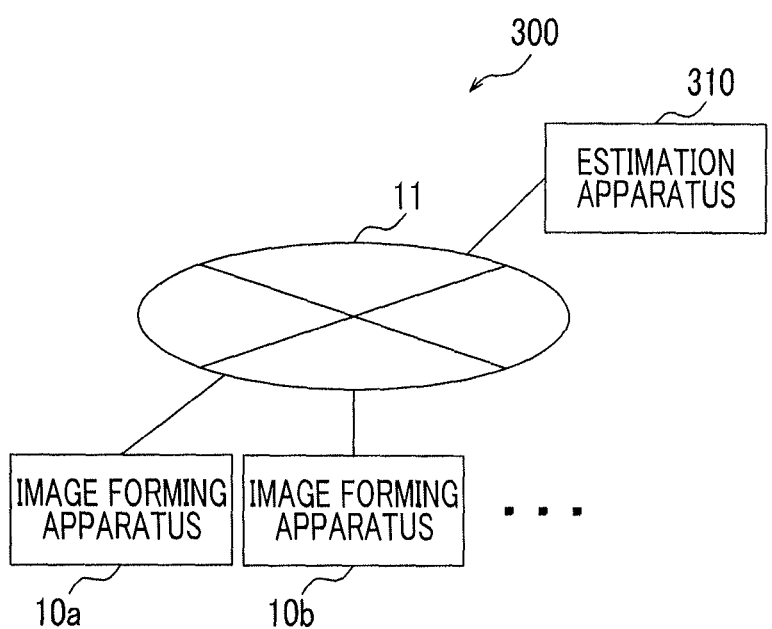
FIG. 1 is a schematic configuration diagram of an estimation system according to an exemplary embodiment.

As illustrated in FIG. 1, the estimation system 300 according to the exemplary embodiment is provided with plural image forming apparatuses 10a, 10b, . . . , and an estimation apparatus 310. Below, in cases where it is unnecessary to distinguish the image forming apparatuses 10a, 10b, . . . , the alphabetic character that is the reference symbol suffix will be omitted.

Each of image forming apparatuses 10 and the estimation apparatus 310 are connected via a communication line 11 determined in advance, such as a local area network (LAN) or wide area network (WAN). Each of the image forming apparatuses 10 and the estimation apparatus 310 transmit various data to one another via the communication line 11.

Next, the configuration of the image forming apparatus 10 according to the exemplary embodiment is described with reference to FIG. 2. In order to avoid complication, a timing sensor 57 and a multiple feed sensor 59, described later (refer to FIG. 3), are not depicted in FIG. 2.

Figure 2:
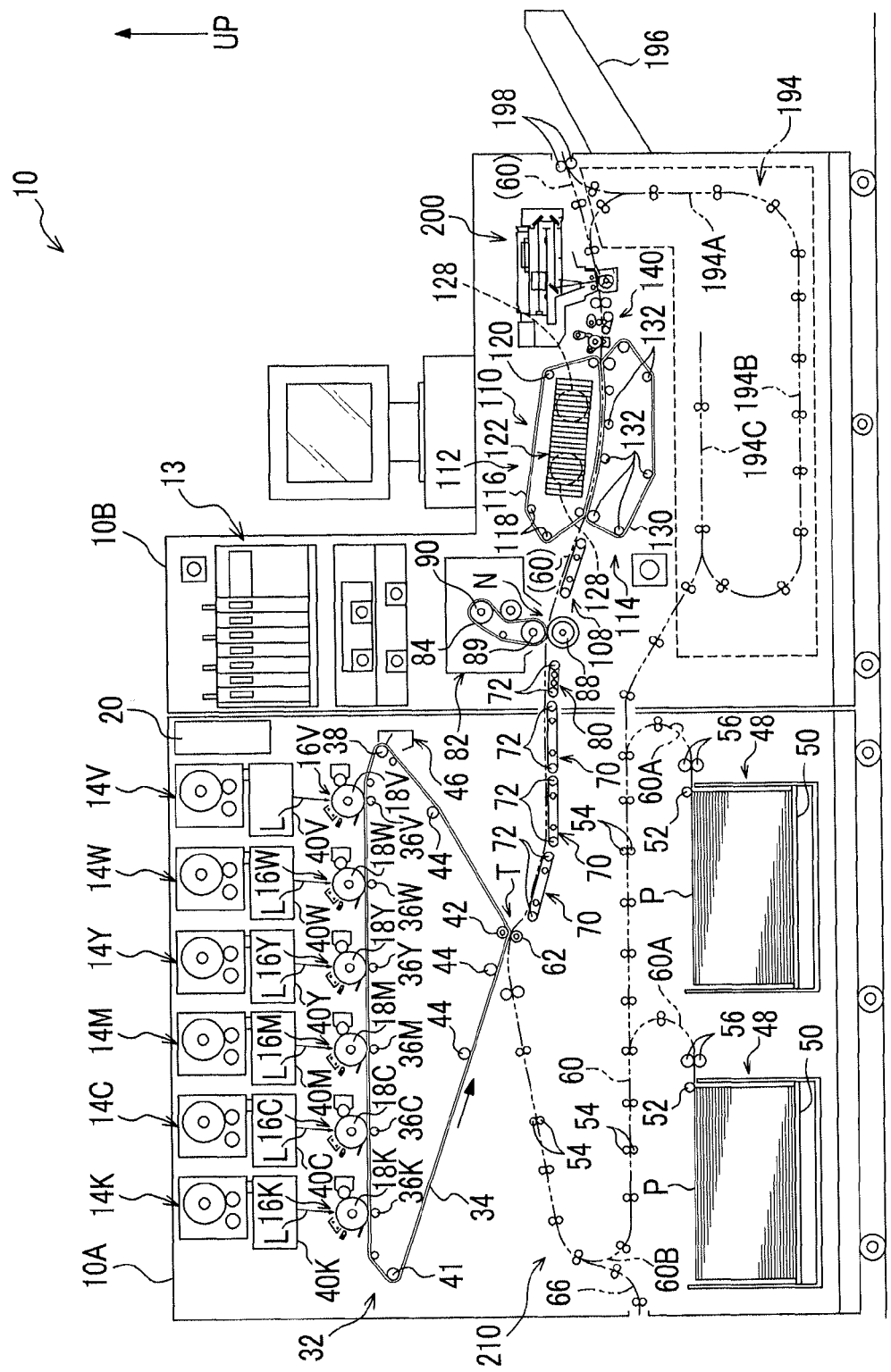
FIG. 2 is a schematic configuration view (cutaway side view) of an image forming apparatus according to the exemplary embodiment.

The image forming apparatus 10 according to the exemplary embodiment forms (prints) a full color image or a black and white image, and includes a first housing 10A in which a first processor that configures a part on one side (left side in FIG. 2) in the horizontal direction is accommodated, as shown in FIG. 2. The image forming apparatus 10 includes a second housing 10B separably connected to the first housing 10A, and in which a second processor that configures a part on another side (right side in FIG. 2) in the horizontal direction.

An image signal processor 13 that subjects the image data sent from an external apparatus, such as a computer, to image processing is provided on the upper portion of the second housing 10B.

Meanwhile, toner cartridges 14V, 14W, 14Y, 14M, 14C, and 14K are provided to be replaceable along the horizontal direction on the upper portion of the first housing 10A. The toner cartridges 14V, 14W, 14Y, 14M, 14C, and 14K accommodate each of a first special color (V), a second special color (W), yellow (Y), magenta (M), cyan (C), and black (K) toners.

An arbitrary color (including transparent) other than the colors of yellow, magenta, cyan, and black is selected, as appropriate, as the first and second special colors. Below, in cases where the first special color (V), second special color (W), yellow (Y), magenta (M), cyan (C), and black (K) are distinguished for each constituent component, description is provided while appending any of V, W, Y, M, C, or K after the numeral. Further, below, in cases where the first special color (V), second special color (W), yellow (Y), magenta (M), cyan (C), and black (K) are not distinguished for each constituent component, V, W, Y, M, C, or K is not appended after the numeral.

Six image forming units 16 corresponding to each color of toner are provided on the lower side of the toner cartridge 14 along the horizontal direction so as to correspond to each toner cartridge 14.

Exposure devices 40 (40V, 40W, 40Y, 40M, 40C, 40K) provided in each image forming unit 16 receive image data subjected to image processing by the above-described image signal processor 13 from the image signal processor 13. Each exposure device 40 irradiates an image holding member 18 (18V, 18W, 18Y, 18M, 18C, 18K), described later, with a light beam L modulated according to the received image data.

Each image forming unit 16 includes the image holding member 18 driven to rotate in one direction. By irradiating each image holding member 18 with the light beams L from each exposure device 40, an electrostatic latent image is formed on each image holding member 18.

A corona discharge type (non-contact charging type) scorotron charger that charges the image holding member 18 and a developing device that develops, with a developer, the electrostatic latent image formed on the image holding member 18 by the exposure device 40 are provided on the periphery of each image holding member 18. A blade that removes developer remaining on the image holding member 18 after transfer and a discharge device that removes the charge after transfer by irradiating the image holding member 18 with light are provided on the periphery of each image holding member 18. The scorotron charger, developing device, blade, and discharge device are arranged opposing the surface of the image holding member 18 in this order from the upstream side toward the downstream side in the rotation direction of the image holding member 18.

A transfer section 32 is provided on the lower side of each image forming unit 16. The transfer section 32 is configured including an annular intermediate transfer belt 34 that contacts with each image holding member 18, and a primary transfer roll 36 by which toner images formed on each image holding member 18 are multiply transferred to the intermediate transfer belt 34.

The intermediate transfer belt 34 is wound around a driving roll 38 driven by a motor, not shown, a tension application roll 41 that applies tension to the intermediate transfer belt 34, a facing roll 42 opposing a secondary transfer roll 62, described later, and plural winding rolls 44.

The intermediate transfer belt 34 is moved cyclically in one direction (counter-clockwise direction in FIG. 2) by the driving roll 38.

Each primary transfer roll 36 is arranged opposing the image holding member 18 of each image forming unit 16 with the intermediate transfer belt 34 interposed therebetween. A transfer bias voltage with the opposite polarity to the polarity of the toner is applied to each primary transfer roll 36 by a power feed unit, not shown. The toner image formed on each image holding member 18 is transferred to the intermediate transfer belt 34 by this configuration.

A removing device 46 that causes the blade to contact with the intermediate transfer belt 34, and removes residual toner, paper debris and the like on the intermediate transfer belt 34 is provided on opposite sides of the driving roll 38 with the intermediate transfer belt 34 interposed therebetween.

Meanwhile, two paper accommodation units 48 in which the papers P as an example of the recording medium are accommodated are provided along the horizontal direction below the transfer section 32.

Each paper accommodation unit 48 is freely withdrawable from the first housing 10A. A delivery roll 52 that delivers the papers P from each paper accommodation unit 48 to a transport path 60 is provided above one end side (right side in FIG. 2) of each paper accommodation unit 48.

A bottom plate 50 on which the papers P are placed is provided in each paper accommodation unit 48. The bottom plate 50 is lowered according to commands of a control device 20, described later, when the paper accommodation unit 48 is drawn out from the first housing 10A. A space which the user replenishes with the papers P is formed in the paper accommodation unit 48 when the bottom plate 50 is lowered.

When the paper accommodation unit 48 withdrawn from the first housing 10A is mounted to the first housing 10A, the bottom plate 50 is risen according to commands of the control device 20. When the bottom plate 50 is risen, the uppermost paper P placed on the bottom plate 50 and the delivery roll 52 contact with each other.

A separation roll 56 that separates papers P overlapping each other which are delivered from the paper accommodation unit 48 from one another is provided on the downstream side (below, simply referred to as "downstream side") of the delivery roll 52 in the transport direction of the paper P. Plural transport rolls 54 that transport the paper P to the downstream side are provided on the downstream side of the separation roll 56. Below, each roll of the delivery roll 52, the transport roll 54, and the separation roll 56 is collectively referred to as a "driving member".

The transport path 60 is provided between the paper accommodation unit 48 and the transfer section 32. The transport path 60 extends to a transfer position T between the secondary transfer roll 62 and the facing roll 42 so that the paper P delivered from the paper accommodation unit 48 is folded back to the left side in FIG. 2 at a first folding section 60A, and folded back to the right side in FIG. 2 at a second folding section 60B.

A transfer bias voltage with the opposite polarity to the polarity of the toner is applied to the secondary transfer roll 62 by a power feed unit. With this configuration, the toner images of each color multiply transferred to the intermediate transfer belt 34 is secondarily transferred to the paper P transported along the transport path 60 by the secondary transfer roll 62.

A preliminary path 66 extending from the side surface of the first housing 10A is provided so as to join the second folding section 60B of the transport path 60. The paper P delivered from a separate paper accommodation unit, not shown, arranged neighboring the first housing 10A enters the transport path 60 through the preliminary path 66.

On the downstream side of the transfer position T, plural transport belts 70 are provided in the first housing 10A which transport the paper P on which the toner image is transferred to the second housing 10B, and a transport belt 80 that transports the paper P transported by the transport belt 70 to the downstream side is provided in the second housing 10B.

Each of the plural transport belts 70 and the transport belt 80 is formed in an annular shape, and is wound around a pair of winding rolls 72. The pair of winding rolls 72 is arranged on each of the upstream side and the downstream side in the transport direction of the paper P, and the transport belt 70 (transport belt 80) is cyclically moved in one direction (clockwise direction in FIG. 2) by one of the pair being driven to rotate.

A fixing unit 82 which fixes the toner image transferred to the surface of the paper P with heat and pressure is provided on the downstream side of the transport belt 80.

The fixing unit 82 is provided with a fixing belt 84, and a compression roll 88 arranged so as to contact with the fixing belt 84 from the lower side. A fixing section N that fixes the toner image by compressing and heating the paper P is formed between the fixing belt 84 and the compression roll 88.

The fixing belt 84 is formed in an annular shape and is wound around a driving roll 89 and a driven roll 90. The driving roll 89 faces the compression roll 88 from the upper side, and the driven roll 90 is arranged on the upstream side of the driving roll 89.

a heating unit, such as a halogen heater, is built into each of the driving roll 89 and the driven roll 90. The fixing belt 84 is heated by the heating unit.

A transport belt 108 that transports the paper P delivered from the fixing unit 82 to the downstream side is provided on the downstream side of the fixing unit 82. The transport belt 108 is formed similarly to the transport belt 70.

A cooling unit 110 that cools the paper P heated by the fixing unit 82 is provided on the downstream side of the transport belt 108.

The cooling unit 110 is provided with an absorption device 112 that absorbs the heat of the paper P and a pressing device 114 that presses the paper P to the absorption device 112. The absorption device 112 is arranged on one side (upper side in FIG. 2) of the transport path 60, and the pressing device 114 is arranged on the other side (lower side in FIG. 2).

The absorption device 112 includes an annular absorption belt 116 that contacts with the paper P, and absorbs the heat of the paper P. The absorption belt 116 is wound around a driving roll 120 that transmits the driving force to the absorption belt 116 and plural winding rolls 118.

A heat sink 122 formed from an aluminum material that dissipates heat absorbed by the absorption belt 116 in planar contacting with the absorption belt 116 is provided on the inner peripheral side of the absorption belt 116.

A fan 128 for discharging heated air that takes heat from the heat sink 122 to the outside is arranged on the rear side (inside of the paper surface shown in FIG. 2) of the second housing 10B.

The pressing device 114 is provided with an annular pressing belt 130 that transports the paper P while pressing the paper P to the absorption belt 116. The pressing belt 130 is wound around plural winding rolls 132.

A correction device 140 that nips and transports the paper P and corrects curvature (curl) of the paper P is provided on the downstream side of the cooling unit 110.

An in-line sensor (registered trademark) 200 that detects toner density defects, image defects, image positioning defects and the like in the toner image fixed to the paper P is provided on the downstream side of the correction device 140.

An exit roll 198 that discharges the paper P on which an image is formed on one side thereof to an exit section 196 attached to the side surface of the second housing 10B is provided on the downstream side of the in-line sensor 200.

Meanwhile, in a case where images are formed on both sides of the paper P, the paper P delivered from the in-line sensor 200 is transported to a reversing path 194 provided on the downstream side of the in-line sensor 200.

A branch path 194A that branches from the transport path 60 and a paper transport path 194B for transporting the paper P transported along the branch path 194A toward the first housing 10A side are provided in the reversing path 194. A reversal path 194C in which the paper P transported along the paper transport path 194B is reversed front-to-back by being switchback transported after folded back in the reverse direction is provided in the reversing path 194.

With this configuration, the paper P switchback transported by the reversal path 194C is transported toward the first housing 10A, and enters the transport path 60 provided above the paper accommodation unit 48, thereby being transported to the transfer position T again.

Next, the image forming step of the image forming apparatus 10 according to the exemplary embodiment is described.

The image data subjected to image processing by the image signal processor 13 is sent to each exposure device 40. Each exposure device 40 radiates each light beam L according to the image data, exposes each image holding member 18 charged by the scorotron charger, and an electrostatic latent image is formed on each image holding member 18.

The electrostatic latent image formed on the image holding member 18 is developed by the developing device, and toner images of each color of the first special color (V), second special color (W), yellow (Y), magenta (M), cyan (C) and black (K) are formed.

The toner images of each color formed on the image holding members 18 of each of the image forming units 16V, 16W, 16Y, 16M, 16C, and 16K are multiply transferred sequentially to the intermediate transfer belt 34 by the six primary transfer rolls 36V, 36W, 36Y, 36M, 36C, and 36K.

The toner images of each color multiply transferred to the intermediate transfer belt 34 are secondarily transferred to the paper P transported from the paper accommodation unit 48 by the secondary transfer roll 62. The paper P on which the toner image is transferred is transported toward the fixing unit 82 provided inside the second housing 10B by the transfer belt 70.

The toner images of each color on the paper P are fixed to the paper P by being heated and compressed by the fixing unit 82. The paper P on which the toner image is fixed is transported to the correction device 140 after passing through the cooling unit 110 and being cooled, and curvature arising in the paper P is corrected.

The paper P in which curvature is corrected is discharged to the exit section 196 by the exit roll 198 after image defects and the like are detected by the in-line sensor 200.

Meanwhile, in a case where an image is formed on the non-image side (rear surface) of the paper P on which the image is not formed (case of duplex printing), the paper P is reversed at the reversing path 194 after passing through the in-line sensor 200. The reversed paper P is delivered to the transport path 60 provided above the paper accommodation unit 48, and the toner image is formed on the rear surface according to the above-described procedure.

Next, a configuration of a transport section 210 according to the exemplary embodiment is described in detail with reference to FIG. 3.

Figure 3:
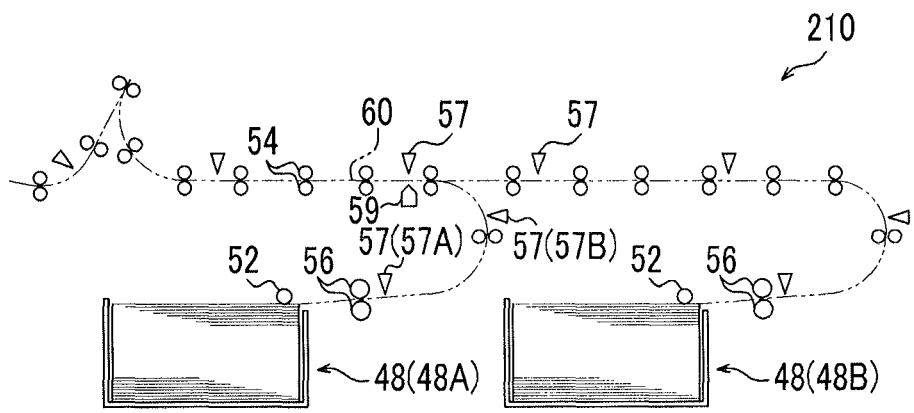
FIG. 3 is a schematic configuration view (cutaway side view) of a transport section of the image forming apparatus according to the exemplary embodiment.

As shown in FIG. 3, the transport section 210 according to the exemplary embodiment is provided with the above-described paper accommodation unit 48, delivery roll 52, transport roll 54, separation roll 56, and transport path 60. The transport section 210 is also provided with plural (9, in the example shown in FIG. 3) timing sensors 57 and the multiple feed sensor 59.

The plural timing sensors 57 according to the exemplary embodiment are provided along the transport path 60. The timing sensors 57 are provided so that at least a pair of transport rolls 54 is positioned between the timing sensors 57 adjacent along the transport path 60. The timing sensor 57 detects the timing at which the leading edge of the paper P passes through the position (below, simply referred to as the "detection position") on the transport path 60 corresponding to the position at which the timing sensor 57 is provided.

Specifically, the timing sensor 57 enters an on state at a timing at which the leading edge of the paper P passes through the detection position, and enters an off state at a timing at which the rear edge of the paper P passes through the detection position. Sensors known in the related art, such as transmissive or reflective sensors disclosed in JP-A-2005-206307, may be applied as the timing sensor 57 according to the exemplary embodiment.

Meanwhile, the multiple feed sensor 59 according to the exemplary embodiment is provided in the vicinity of the convergence point of each transport path 60 on the downstream side in the transport direction. The multiple feed sensor 59 detects if plural papers P are transported while overlapping each other (below, referred to as "multiple feeding"). Sensors known in the related art may also be applied as the multiple feed sensor 59 according to the exemplary embodiment.

Next, the main configuration of the electrical system of the image forming apparatus 10 according to the exemplary embodiment is described with reference to FIG. 4.

Figure 4:
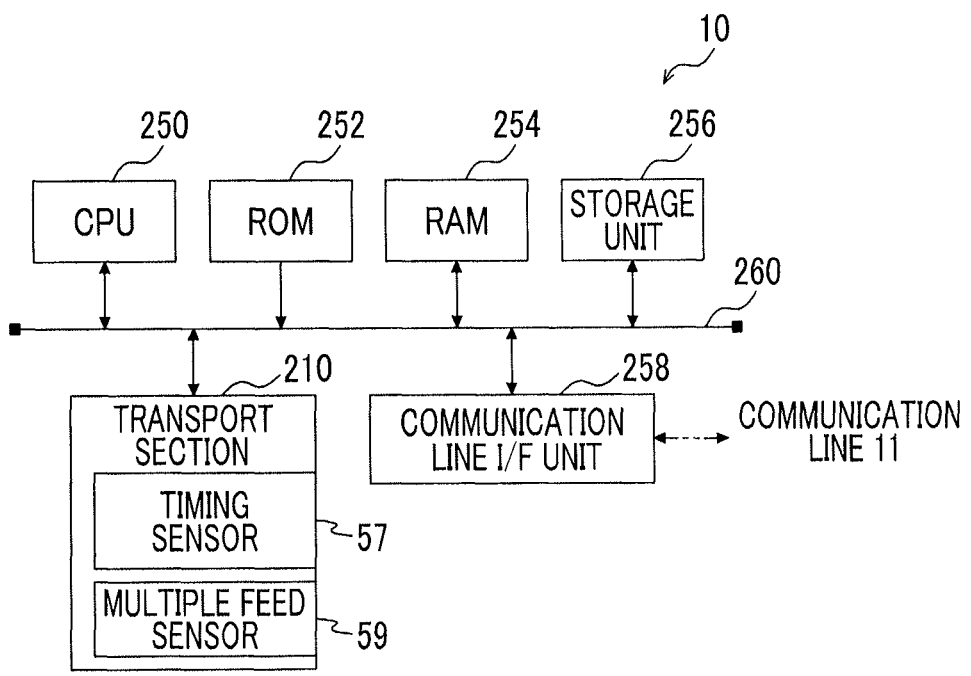
FIG. 4 is a block diagram showing the main configuration of an electrical system of the image forming apparatus according to the exemplary embodiment.

As shown in FIG. 4, the image forming apparatus 10 according to the exemplary embodiment is provided with a central processing unit (CPU) 250 that administers the overall operations of the image forming apparatus 10, and a read only memory (ROM) 252 in which various programs, various parameters and the like are stored in advance. The image forming apparatus 10 is also provided with a random access memory (RAM) 254 that is used as a work area or the like when various programs are executed by the CPU 250 and a nonvolatile storage unit 256, such as a flash memory. The image forming apparatus 10 is further provided with a communication line interface (I/F) unit 258 that is connected to the communication line 11 and transmits and receives communication data with another external apparatus connected to the communication line 11.

Each of these portions is connected to one another via a bus 260 such as an address bus, data bus, and a control bus. Each timing sensor 57 and the multiple feed sensor 59 provided in the transport section 210 are also connected to the bus 260. With this configuration, the timing at which each timing sensor 57 enters the on state and the timing at which the sensor enters the off state is detected by the CPU 250 via the bus 260. Accordingly, the period until the leading edge of the paper P passes through the detection position and each timing sensor 57 enters the on state (below, referred to as "first transit time") with the point in time that the paper feeding from the paper accommodation unit 48 begins as the origin is detected by the CPU 250. Because each timing sensor 57 is fixed at a predetermined installation position, which timing sensor 57 the detected first transit time is obtained from is specified by the CPU 250.

Failures where the paper P is not fed from the paper accommodation unit 48 (so-called misfeeds) and paper jams (so-called jams) are also detected by the CPU 250 according to the state of each timing sensor 57. Specifically, these failures are detected by the CPU 250 using each timing sensor 57 not entering the on state even though the range of period determined in advance for each timing sensor 57 as a period in which the paper P is normally transported is exceeded. Below, misfeeds and jams are collectively referred to as "transport stop failures".

A multiple feed is detected by the CPU 250 according to the output from the multiple feed sensor 59 via the bus 260. Below, transport failures of the paper P such as misfeeds, jams, and multiple feeds are collectively referred to as "paper transport failures."

Next, the main configuration of the electrical system of the estimation apparatus 310 according to the exemplary embodiment is described with reference to FIG. 5.

Figure 5:
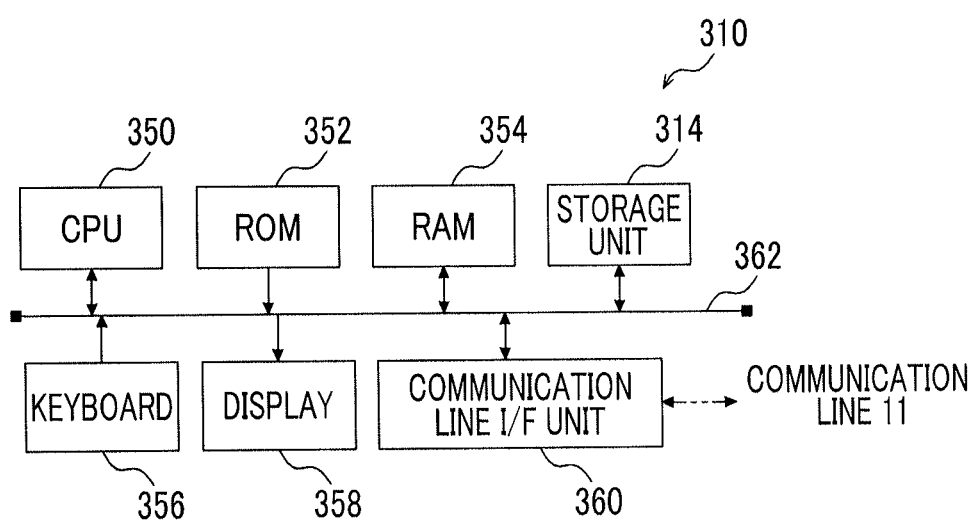
FIG. 5 is a block diagram showing the main configuration of an electrical system of an estimation apparatus according to the exemplary embodiment.

As shown in FIG. 5, the estimation apparatus 310 according to the exemplary embodiment is provided with a CPU 350 that administers the overall operations in the estimation apparatus 310, and a ROM 352 in which various programs, various parameters and the like are stored in advance. The estimation apparatus 310 is also provided with a RAM 354 that is used as a work area or the like when various programs are executed by the CPU 350 and a nonvolatile storage unit 314, such as a hard disk drive (HDD).

The estimation apparatus 310 is also provided with a keyboard 356 with which a variety of information is input and a display 358 that displays a variety of information. The estimation apparatus 310 is further provided with a communication line I/F unit 360 that is connected to the communication line 11 and transmits and receives communication data with another external apparatus connected to the communication line 11. Each of these portions is connected to one another via a bus 362 such as an address bus, data bus, and a control bus.

In the image forming apparatus 10 according to the exemplary embodiment, there are cases where paper transport failures occur due to change in condition of the driving member over the course of years or the attachment of paper debris or dust to the driving member during image formation. In a case where a paper transport failure arises, there are cases where maintenance work by a maintenance worker such as replacement or cleaning of the driving member is required, and in this case, use of the image forming apparatus 10 is stopped while the maintenance worker is performing the maintenance work. Here, if the occurrence of the paper transport failure is ascertained beforehand and it is possible to perform the maintenance work in a time period or the like in which the usage frequency of the image forming apparatus 10 is low, such as evening hours or a holiday before the paper transport failure occurs, the convenience for the user is improved, which is preferable.

Therefore, a transport failure information estimation function that estimates the transport failure information pertaining to transport failures of the paper P is built-into the estimation apparatus 310 according to the exemplary embodiment. An information transmission function that transmits information necessary for realizing the transport failure information estimation function to the estimation apparatus 310 is built-into the image forming apparatus 10 according to the exemplary embodiment.

Figure 6:
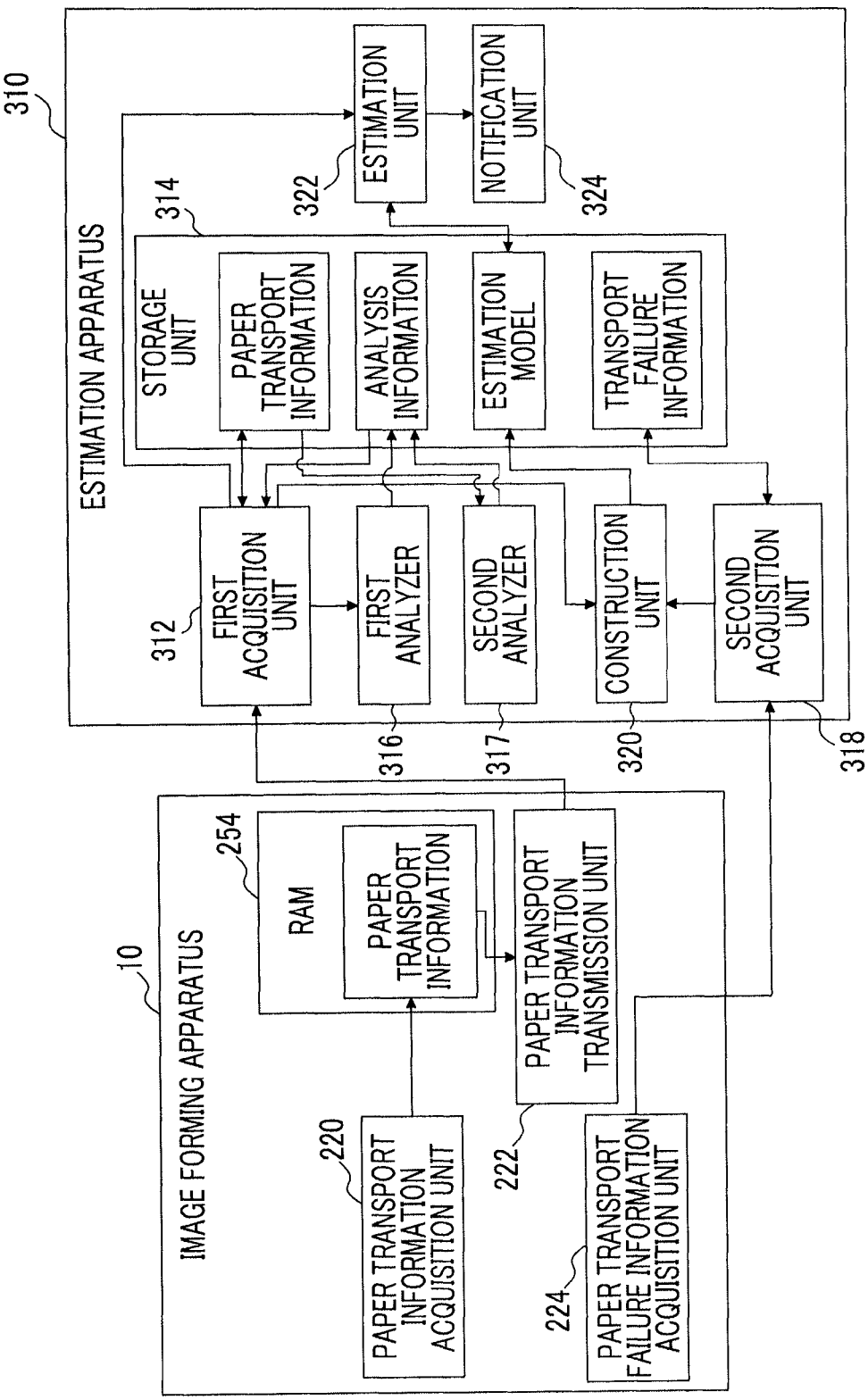
FIG. 6 is a functional block diagram showing a functional configuration of the image forming apparatus and the estimation apparatus according to the exemplary embodiment.

Next, the information transmission function and the transport failure information estimation function are described with reference to FIG. 6. FIG. 6 is a functional block diagram for describing the information transmission function and the transport failure information estimation function according to the exemplary embodiment. As shown in FIG. 6, the image forming apparatus 10 according to the exemplary embodiment is provided with a paper transport information acquisition unit 220, a paper transport information transmission unit 222, and a paper transport failure information acquisition unit 224.

The paper transport information acquisition unit 220 according to the exemplary embodiment acquires the first transit time for each timing sensor 57 pertaining to the continuously transported M1 papers P, M1 being a number set in advance (in the exemplary embodiment, 20 papers as an example) for each period T1 (in the exemplary embodiment, a period in which images are formed on 1000 papers P as an example) determined in advance as the period for acquiring the information. The paper transport information acquisition unit 220 also acquires the paper characteristic information indicating the characteristics of the papers P and the accommodation unit information for identifying the paper accommodation unit 48 in which the papers P are accommodated according to the image formation command input from outside.

In the exemplary embodiment, information indicating the type corresponding to the characteristics of the surface of the paper P, such as ordinary paper and coated paper, and information indicating the basis weight (g/m$^2$) representing the weight of the paper P per unit area are applied as the paper characteristic information. In the exemplary embodiment, information indicating the size (in the exemplary embodiment, area (mm$^2$)) of the papers P and information indicating whether the image formation on the paper P is overprinting in which an another image is formed overlapping the image formed on the paper P or not are also applied as the paper characteristic information. The paper transport information acquisition unit 220 correlates each item of information acquired with the acquisition date and time and stores the information in the RAM 254. Either one of the basis weight and the size of the paper P may be applied as the paper characteristic information, rather than both. The length of the paper P in the transport direction and the width of the paper P in the intersection direction that intersects the transport direction may be applied, instead of the area, as the information indicating the size of the paper P.

The paper transport information transmission unit 222 according to the exemplary embodiment transmits the acquisition date and time, first transit time, paper characteristic information, and accommodation unit information of M1 papers stored in the RAM 254 by the paper transport information acquisition unit 220 to the estimation apparatus 310 via the communication line I/F unit 258. Along with this information, the paper transport information transmission unit 222 also transmits the model information indicating the model of the image forming apparatus 10 and the apparatus identification (ID) for individually identifying the image forming apparatus 10 to the estimation apparatus 310 via the communication line I/F unit 258. The paper transport information transmission unit 222 according to the exemplary embodiment transmits each of the above items of information to the estimation apparatus 310 at a timing at which the respective information for M1 papers is stored in the RAM 254 or a timing at which the job (unit of processing executed according to one image forming command) finishes.

The paper transport failure information acquisition unit 224 according to the exemplary embodiment acquires information indicating the classification of paper transport failure (below, "failure classification information"), such as a misfeed, jam, and multiple feed, in a case where a paper transport failure occurs. The paper transport failure information acquisition unit 224 transmits, the date and time the failure classification information is acquired, the failure classification information, information (below, referred to "detection sensor information") that specifies the sensor by which the paper transport failure is detected, and the above-described model information and apparatus ID to the estimation apparatus 310 via the communication line I/F unit 258. The paper transport failure information acquisition unit 224 according to the exemplary embodiment transmits each item of information above to the estimation apparatus 310 for each acquisition. The paper transport failure information acquisition unit 224 according to the exemplary embodiment transmits information that indicates the timing sensor 57 on the upstream side in the transport direction of the combination of adjacent timing sensors 57 along the transport path 60 with the position at which the jam occurs interposed therebetween as the detection sensor information, in a case where a jam occurs. Below, the combination of two adjacent timing sensors 57 along the transport path 60 is referred to as a "sensor pair".

Meanwhile, the estimation apparatus 310 according to the exemplary embodiment is provided with a first acquisition unit 312, a first analyzer 316, a second analyzer 317, a second acquisition unit 318, a construction unit 320, an estimation unit 322, and a notification unit 324.

The first acquisition unit 312 according to the exemplary embodiment acquires the acquisition date and time, first transit time, paper characteristic information, accommodation unit information, model information, and apparatus ID transmitted by the paper transport information transmission unit 222 via the communication line I/F unit 360. The first acquisition unit 312 correlates and stores the acquired information in the storage unit 314, and outputs the information to the first analyzer 316. FIG. 7 schematically shows an example of information (below, referred to as "paper transport information") stored in the storage unit 314 by the first acquisition unit 312 according to the exemplary embodiment.

As shown in FIG. 7, the paper transport information according to the exemplary embodiment includes the acquisition date and time, apparatus information, paper characteristic information, and first transit time. The apparatus information includes the model information, apparatus ID, and accommodation unit information.

The acquisition date and time, apparatus information, paper characteristic information, and first transit time are information transmitted from the above-described paper transport information transmission unit 222. The first transit time is information that indicates the first transit time (unit: milliseconds (ms)) acquired by the paper transport information acquisition unit 220 for each timing sensor 57. As an example, the accommodation unit Y1 shown in FIG. 7 corresponds to a paper accommodation unit 48A shown in FIG. 3, and the sensors S1 and S2 shown in FIG. 7 correspond respectively to the timing sensors 57A and 57B shown in FIG. 3. In FIG. 7, in order to avoid complication, the first transit time for sensors other than the sensors S1 and S2 will not be described.

The first analyzer 316 according to the exemplary embodiment analyzes the paper transport information input from the first acquisition unit 312, and stores the information obtained by the analysis in the storage unit 314 for each item of model information. Specifically, the first analyzer 316 derives the average value of the transit time and the square root of the dispersion value (standard deviation) for each sensor as the statistical quantity (below, referred to as "transport state characteristic amount") indicating the characteristics of the transport state of the paper P from the first transit time of M1 papers included in the paper transport information.

The second analyzer 317 according to the exemplary embodiment analyzes the paper transport information stored in the storage unit 314 by the first acquisition unit 312. The second analyzer 317 correlates information obtained through the analysis with the information of the date and time corresponding to the date and time of the information stored in the storage unit 314 by the first analyzer 316 and stores the information in the storage unit 314 for each item of model information. Specifically, the second analyzer 317 derives information (below, referred to as "utilization information") indicating the utilization of the paper P from the information indicating each of the type, basis weight, and size of the paper P included in the paper transport information, and information indicating whether the printing is overprinting.

More specifically, the second analyzer 317 derives the number of times (below, referred to as "paper switching frequency") at least one of the type, basis weight, and size of the paper P included in the paper transport information is switched per unit printing number for each timing T2 determined in advance as the utilization information for each item of model information. The second analyzer 317 also further derives the number of paper on which overprinting is performed per unit printing number (below, referred to as an "overprinting frequency") for each timing T2 as the utilization information for each item of model information.

In the exemplary embodiment, although the timing at which the number of records of each apparatus ID in the paper transport information reaches each of the number of records or higher (as an example, 200) determined in advance is applied as the timing T2, there is no limitation thereto. For example, another timing, such as the same timing as a timing at which analysis is performed by the first analyzer 316 or a timing per predetermined period (as an example, one day), may be applied as the timing T2.

FIG. 8 schematically shows an example of information (below, referred to as "analysis information") analyzed by the first analyzer 316 and the second analyzer 317 according to the exemplary embodiment in the image forming apparatuses 10 of the same model and stored in the storage unit 314.

As shown in FIG. 8, the analysis information according to the exemplary embodiment includes the acquisition date and time, paper characteristic information, transport state characteristic amount, and utilization information. The transport state characteristic amount includes the average value of the first transit time and the square root of the dispersion value for each timing sensor 57, and the average value and the square root of the dispersion value of the transit time (below, referred to as "second transit time") of the paper P passing through adjacent timing sensors 57 along the transport path 60. The second transit time is derived by subtracting the first transit time of the timing sensor 57 positioned on the upstream side in the transport direction from the first transit time of the timing sensor 57 positioned on the downstream side in the transport direction in each sensor pair.

The second acquisition unit 318 according to the exemplary embodiment acquires the acquisition date and time, failure classification information, model information, and apparatus ID transmitted by the paper transport failure information acquisition unit 224 via the communication line I/F unit 360, and correlates and stored these items of information (below, referred to as "transport failure accumulation information") in the storage unit 314. FIG. 9 schematically shows an example of transport failure accumulation information according to the exemplary embodiment.

As shown in FIG. 9, the transport failure accumulation information according to the exemplary embodiment includes the acquisition date and time, apparatus information, failure classification information and detection sensor information. The apparatus information includes the model information, and apparatus ID.

Here, the acquisition date and time, apparatus information, failure classification information, and detection sensor information are information transmitted from the paper transport failure information acquisition unit 224 to the second acquisition unit 318. As an example, the detection sensor information S1 and S2 shown in FIG. 9 correspond respectively to the timing sensors 57A and 57B shown in FIG. 3, and J1 corresponds to the multiple feed sensor 59.

The construction unit 320 according to the exemplary embodiment constructs the estimation model for estimating the transport failure information pertaining to transport failures of the paper P due to the driving member for each item of model information and for each sensor pair. Specifically, the first acquisition unit 312 acquires the paper transport information and analysis information from the storage unit 314 and outputs the information to the construction unit 320. The second acquisition unit 318 acquires transport failure accumulation information from the storage unit 314 and outputs the information to the construction unit 320. The construction unit 320 constructs the estimation model for estimating the transport failure information with the paper transport information and the analysis information input by the first acquisition unit 312 as input information, and the transport failure information corresponding to the transport failure accumulation information input by the second acquisition unit 318 as output information, and stores the estimation model in the storage unit 314.

The estimation unit 322 according to the exemplary embodiment uses the estimation model stored in advance in the storage unit 314, and estimates the transport failure information with the paper transport information and the analysis information acquired by the first acquisition unit 312 for the image forming apparatus 10 that is the estimation target of the transport failure information as input information.

The notification unit 324 according to the exemplary embodiment performs a notification that maintenance work is necessary, in a case where the values indicated by the transport failure information estimated by the estimation unit 322 is a threshold determined in advance or higher.

Incidentally, the processing by each constituent element configured as above may be realized through a software configuration using a computer by executing a program. However, needless to say there is no limitation to realization through a software configuration, and the processing may be realized by a hardware configuration or a combination of a hardware configuration and software configuration. As an exemplary embodiment of a case of realizing each constituent element through a hardware configuration, an aspect in which a functional element that executes the same processing as each constituent element is created and applied is given as an example.

Below, a case is described in which processing by each constituent element is realized by each constituent element executing the program. In this case, an aspect in which the corresponding program is pre-installed in the image forming apparatus 10 and the estimation apparatus 310, an aspect in which the program is provided in a state of being stored on a computer-readable recording medium, an aspect in which the programs is delivered via a communication unit in a wired or wireless manner, or the like may be applied.

Figure 10:
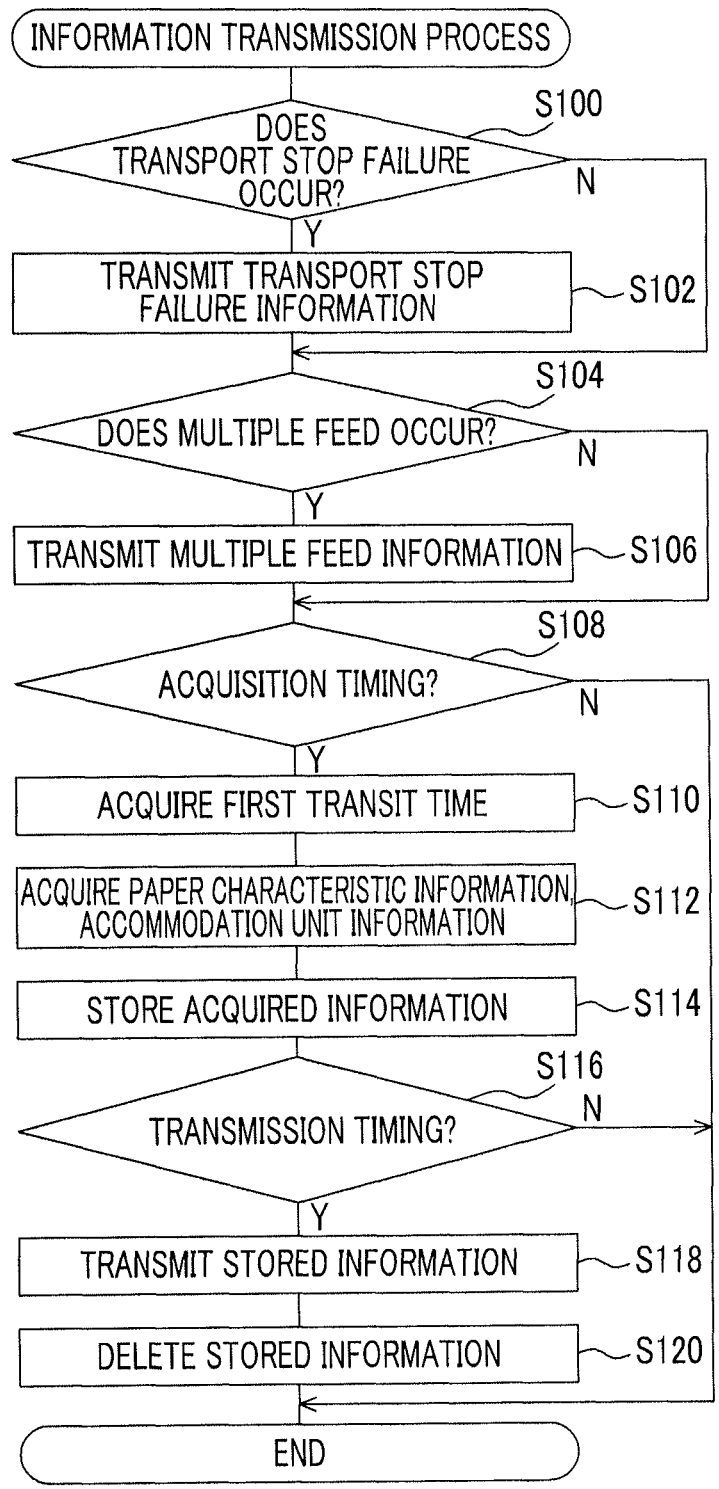
FIG. 10 is a flowchart showing a processing flow of an information transmission processing program according to the exemplary embodiment.

Next, the action of the image forming apparatus 10 according to the exemplary embodiment is described with reference to FIG. 10. FIG. 10 is a flowchart showing a processing flow of an information transmission processing program executed by the CPU 250 each time the image formation command for the paper P is input by the image forming apparatus 10, and the program is pre-installed in the ROM 252. Here, in order to simplify and clarify the description, the process of forming the image with the image forming apparatus 10 will be omitted.

In the step S100 in FIG. 10, the CPU 250 determines whether a transport stop failure occurs based on output from each timing sensor 57, as described above. In a case where the determination is a positive determination, the CPU 250 transitions to the processing in the step S102. In the step S102, the CPU 250 transitions to the processing in the step S104 after the acquisition date and time of the failure classification information, the failure classification information, the detection sensor information, and model information of the device itself and the apparatus ID are transmitted to the estimation apparatus 310 via the communication line I/F unit 258. Meanwhile, in a case of a negative determination in the processing in the step S100, the CPU 250 transitions to the step S104 without executing the processing of the step S102.

In the step S104, the CPU 250 determines whether a multiple feed occurs based on the output from the multiple feed sensor 59 as described above. In a case where the determination is a positive determination, the CPU 250 transitions to the processing in the step S106. In the step S106, the CPU 250 transitions to the processing in the step S108 after the acquisition date and time of the failure classification information, the failure classification information, the detection sensor information, and model information of the device itself and the apparatus ID are transmitted to the estimation apparatus 310 via the communication line I/F unit 258. Meanwhile, in a case of a negative determination in the processing in the step S104, the CPU 250 transitions to the processing in the step S108 without executing the processing of the step S106.

In the step S108, the CPU 250 determines whether a timing is reached which is set in advance as a timing at which the first transit time is acquired. In a case where the determination is a positive determination, the CPU 250 transitions to the processing in the step S110. In the exemplary embodiment, although the first transit time of M1 papers continuously transported is acquired for each period T1 as described above, there is no limitation thereto. For example, another timing such as a timing at which the paper transport failure is detected, and a timing per period set in advance (as an example, three hours) may be applied as the timing.

In the step S110, the CPU 250 acquires the first transit time for each timing sensor 57 as described above, and in the next step S112, the CPU 250 acquires the paper characteristic information and the accommodation unit information as described above. In the next step S114, the CPU 250 correlates the first transit time and the acquisition date and time of the first transit time acquired by the processing of the step S110 and the paper characteristic information and the accommodation unit information acquired by the processing in the step S112, and stores the information in the RAM 254.

In the next step S116, the CPU 250 determines whether a timing is reached which is set in advance as a timing at which the information stored in the RAM 254 is transmitted. In a case where the determination is a positive determination, the CPU 250 transitions to the processing in the step S118. In the exemplary embodiment, although a timing at which the information of M1 papers is stored in the RAM 254 is applied as the timing at which the information is transmitted, there is no limitation thereto. For example, another timing such as a timing at which the paper transport failure is detected, and a timing per period set in advance (as an example, one day) may be applied as the timing at which the information is transmitted.

In the step S118, the CPU 250 transmits the information stored in the RAM 254 by the processing in the step S114, the model information of the device itself, and the apparatus ID to the estimation apparatus 310 via the communication line I/F unit 258. In the next step S120, the CPU 250 deletes the information stored in the RAM 254 by the processing of the step S114 from the RAM 254, and ends the present information transmission processing program. Meanwhile, in a case of a negative determination in the processing of the step S108 and the step S116, the CPU 250 ends the present information transmission processing program.

Figure 11:
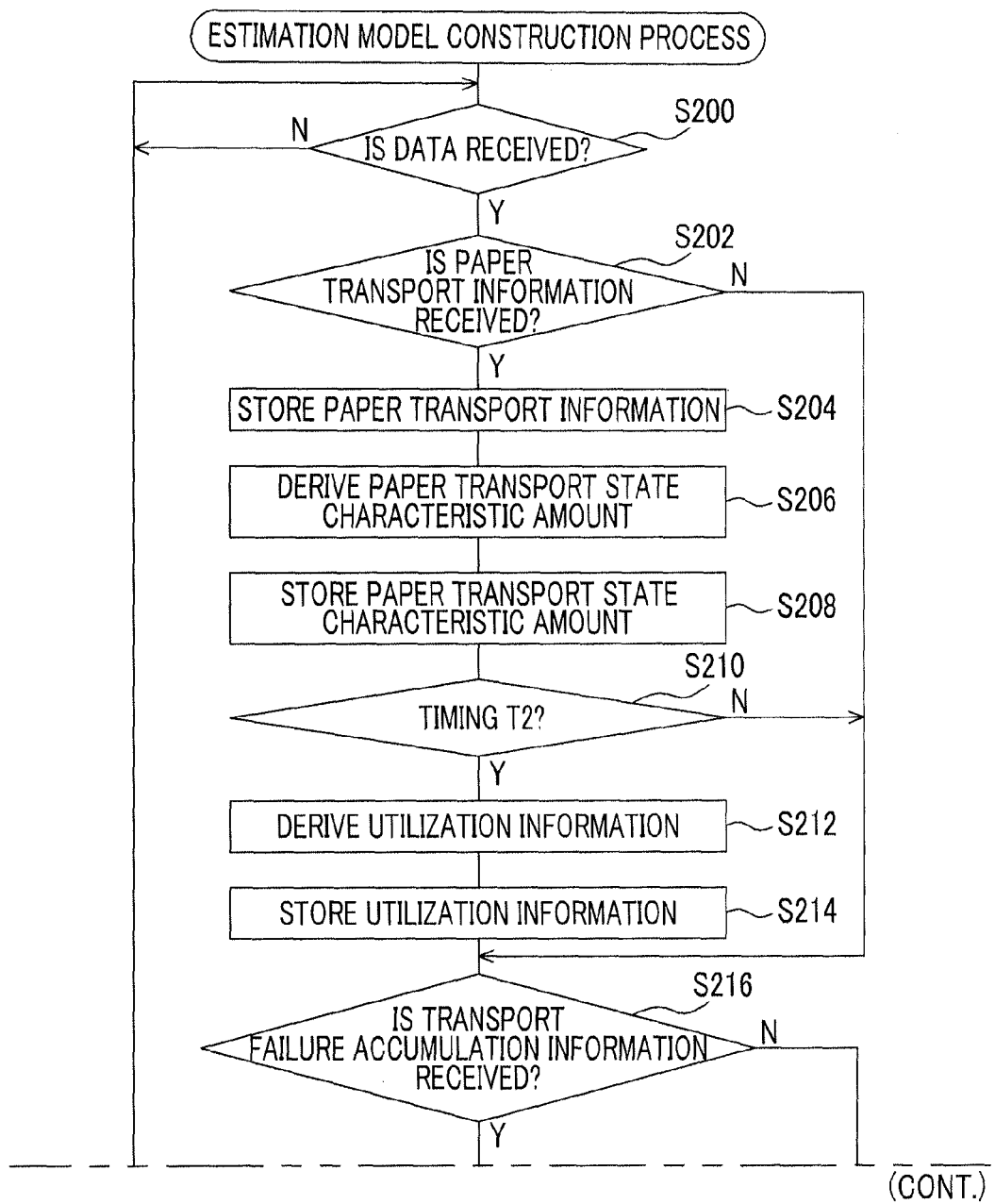
FIG. 11 is a flowchart showing a processing flow of an estimation model construction processing program according to the exemplary embodiment.
Figure 12:
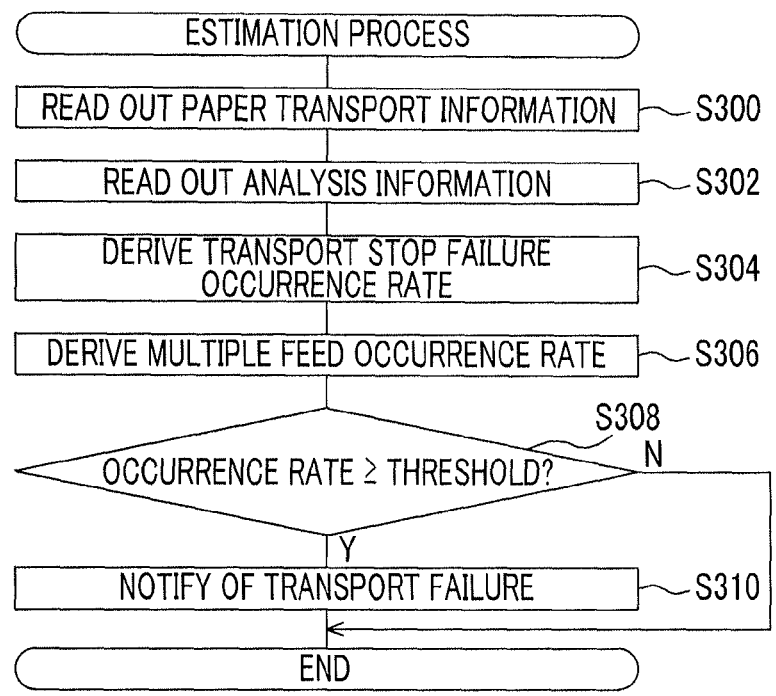
FIG. 12 is a flowchart showing a processing flow of estimation processing program according to the exemplary embodiment.

Next, the operation of the estimation apparatus 310 according to the exemplary embodiment will be described with reference to FIGS. 11 and 12. FIG. 11 is a flowchart showing the processing flow of the estimation model construction processing program executed by the CPU 350 of the estimation apparatus 310 at a timing at which the power source of the estimation apparatus 310 enters the on state. FIG. 12 is a flowchart that shows the processing flow of the estimation processing programs executed by the CPU 350 of the estimation apparatus 310 for each period determined in advance (as an example, one day). Each of these programs is installed in advance in the ROM 352.

The processing flow of the estimation model construction processing program is described with reference to FIG. 11.

In the step S200 in FIG. 11, the CPU 350 stands by until information transmitted by the processing in step S102, step S106 or step S118 of the information transmission processing program is received. In the step S202, the CPU 350 determines whether the information received by the processing in the step S200 is paper transport information, and in the case where the determination is a positive determination, the process transitions to the processing in the step S204.

In the step S204, the CPU 350 stores the received paper transport information in the storage unit 314. The paper transport information is stored in the storage unit 314, as schematically shown in FIG. 7, by the processing in the step S204. In the next step S206, the CPU 350 derives the transport state characteristic amount from the paper transport information received by the processing in the step S200, as described above. In the next step S208, the CPU 350 transitions to the processing in the step S210 after the transport state characteristic amount derived by the processing in the step S206 is stored in the storage unit 314, as described above.

In the step S210, the CPU 350 determines whether the timing T2 is reached. In a case where the determination is a positive determination, the CPU 350 transitions to the processing in the step S212. In the step S212, the CPU 350 derives the utilization information from the paper transport information stored in the storage unit 314 by the processing in the step S204, as described above. In the next step S214, the CPU 350 transitions to the processing in the step S216 after the utilization information derived by the processing in the step S212 is stored in the storage unit 314, as described above. The analysis information is stored in the storage unit 314 by the processing in the steps S208 and S214, as schematically shown in FIG. 8.

Meanwhile, in a case of a negative determination in the processing in the step S210, the CPU 350 transitions to the processing in the step S216 rather than executing the processing of the steps S212 to S214. In a case of a negative determination in the step S202, the CPU 350 transitions to the processing in the step S216 rather than executing the processing of the steps S204 to S214.

In the step S216, the CPU 350 determines whether the information received by the processing in the step S200 is transport failure accumulation information, and in the case where the determination is a positive determination, transitions to the processing in the step S218. In the step S218, the CPU 350 transitions to the processing in the step S220 after the transport failure accumulation information received by the processing in the step S200 is stored in the storage unit 314, as described above. The transport failure accumulation information is stored in the storage unit 314, as schematically shown in FIG. 9, by the processing in the step S218. Meanwhile, in a case of a negative determination in the step S216, the CPU 350 transitions to the processing in the step S220 rather than executing the processing of the step S218.

In the step S220, the CPU 350 determines whether the number of records of transport failure accumulation information stored in the storage unit 314 reaches a threshold set in advance (in the exemplary embodiment, as an example, 30 cases) or more. The CPU 350 transitions to the processing of the step S222 in a case where the determination is a positive determination, whereas, in a case where the determination is a negative determination, the process returns to the processing in the step S200.

In the step S222, the CPU 350 derives the failure occurrence rate (failure occurrence frequency) indicated by the number of occurrences of failures per number of unit printings (in the exemplary embodiment, as an example, 10000 papers) of the paper P based on the transport failure accumulation information and the paper transport information for each transport stop failure and multiple feed. In the next step S224, the CPU 350 reads out all items of information of the paper transport information and the analysis information from the storage unit 314, and constructs the estimation model for each model and for each sensor pair with each item of information as input information, and the failure rate derived by the processing in the step S222 as the output information.

Here, the construction of the estimation model is described in detail. In the exemplary embodiment, as an example, multiple regression analysis is used in the construction of the estimation model. Here, although a case of constructing the estimation model for the sensor pair of the above-described sensors S1 and S2 is described in order to avoid complication, the estimation model is also similarly constructed for other sensor pairs.

In the exemplary embodiment, the transport state characteristic amount (average value of each transit time and the square root of the dispersion value) of each transit time of the first and second transit times in each of the two types of paper characteristic information (ordinary paper or coated paper) is applied as the input information (explanatory variable) of the multiple regression analysis. In the exemplary embodiment, the paper switching frequency and the overprinting frequency are also applied as the input information of the multiple regression analysis. Meanwhile, in the exemplary embodiment, the occurrence rates of the transport stop failures and multiple feedings are each applied as the output information (object variable) of the multiple regression analysis. The CPU 350 performs the multiple regression analysis using the input information and output information and obtains the multiple regression analysis coefficient and constant term. The numerical expression of the multiple regression analysis according to the exemplary embodiment is shown in the following formulae (1) and (2).

Equation 1

$$P_m(t_n) = a_1 \times x_1(t_n) + a_2 \times x_2(t_n) + \ldots + a_{10} \times x_{10}(t_n) + c1 \quad (1)$$

$$P_d(t_n) = b_1 \times x_1(t_n) + b_2 \times x_2(t_n) + \ldots + b_{10} \times x_{10}(t_n) + c2 \quad (2)$$

$P_m(t_n)$: transport stop failure occurrence rate at the timing $t_n$
$P_d(t_n)$: multiple feed occurrence rate at timing $t_n$
$a_1$ to $a_{10}$: multiple regression analysis coefficient of estimation model of transport stop failure occurrence rate for each item of input information
$b_1$ to $b_{10}$: multiple regression analysis coefficient of estimation model of multiple feed occurrence rate for each item of input information
$x_1(t_n)$ to $x_{10}(t_n)$: each item of input information at timing $t_n$
c1: constant term of estimation model of transport stop failure occurrence rate
c2: constant term of estimation model of multiple feed occurrence rate In the exemplary embodiment, each of the transport state characteristic amounts (average value of first transit time, square root of dispersion value of first transit time, average value of second transit time, and square root of dispersion value of second transit time) in which the type of paper P is ordinary paper is applied to $x_1(t_n)$ to $x_4(t_n)$, as an example. In the exemplary embodiment, each of the transport state characteristic amounts (average value of first transit time, square root of dispersion value of first transit time, average value of second transit time, and square root of dispersion value of second transit time) in which the type of paper P is coated paper is applied to $x_5(t_n)$ to $x_8(t_n)$, as an example. In the exemplary embodiment, the paper switching frequency is applied to $x_9(t_n)$, and the overprinting frequency is applied to $x_{10}(t_n)$ as an example.

In this way, in the exemplary embodiment, although a linear function is applied to the regression formula used in the multiple regression analysis, there is no limitation thereto. For example, a regression formula such as a secondary function or an exponential function may be applied as the regression formula according to empirical rules or the like. The multiple regression analysis coefficients of $a_1$ to $a_{10}$ and $b_1$ to $b_{10}$ may be applied by selecting a number of multiple regression analysis coefficients set in advance with an information amount standard, such as Akaike's information criterion (AIC) as an evaluation index in order to improve the versatility of the estimation model.

In the next step S226, the CPU 350 stores (updates) the estimation model by storing the multiple regression analysis coefficient and the constant term derived by the processing in the step S224 in the storage unit 314. In the next step S228, the CPU 350 determines whether an end timing set in advance is reached, and in a case where the determination is a negative determination, the process returns to the step S200, whereas, in the case where the determination is a positive determination, the present estimation model construction processing ends. In the exemplary embodiment, although a timing at which the power switch of the estimation apparatus 310 is set to the off state is applied as the end timing applied in the processing of the step S228, there is no limitation thereto. For example, needless to say, another timing, such as a timing at which a command input instructing the ending of the present estimation model construction processing program is performed by a user via the keyboard 356 or the like may be applied as the end timing.

Next, the processing flow of the estimation processing program that estimates the transport failure information using the estimation model constructed by the estimation model construction processing program is described with reference to FIG. 12.

In the step S300 in FIG. 12, the CPU 350 reads out the newest paper transport information for which estimation of the transport failure information is not performed of the paper transport information stored in the storage unit 314. In the next step S302, the CPU 350 reads out the analysis information corresponding to the paper transport information read out by the process in the step S300 stored in the storage unit 314. In the next step 304, the CPU 350 uses the estimation model for estimating the transport stop failure occurrence rate stored in the storage unit 314 and derives the transport stop failure occurrence rate for each device and each sensor pair with each item of information read out by the processing in the step S300 and each item of information read out by the processing in the step S302 as the input information. In the next step S306, the CPU 350 uses the estimation model for estimating the multiple feed occurrence rate stored in the storage unit 314 and derives the multiple feed occurrence rate for each device and each sensor pair with each item of information read out by the processing in the step S300 and each item of information read out by the processing in the step S302 as the input information.

In the next step S308, the CPU 350 determines whether at least one of the transport stop failure occurrence rate derived by the processing in the step S304 and the multiple feed occurrence rate derived by the processing in the step S306 reaches a threshold set in advance or higher. In a case where the determination is a positive determination, the CPU 350 transitions to the processing in the step S310. The threshold used in the processing in the step S308 may be different values from the transport stop failure occurrence rate and the multiple feed occurrence rate, or may be the same value. The threshold may be set according to the promptness of the countermeasures to the transport failures demanded, or may be set by being input by a user via the keyboard 356 or the like.

Figure 13:
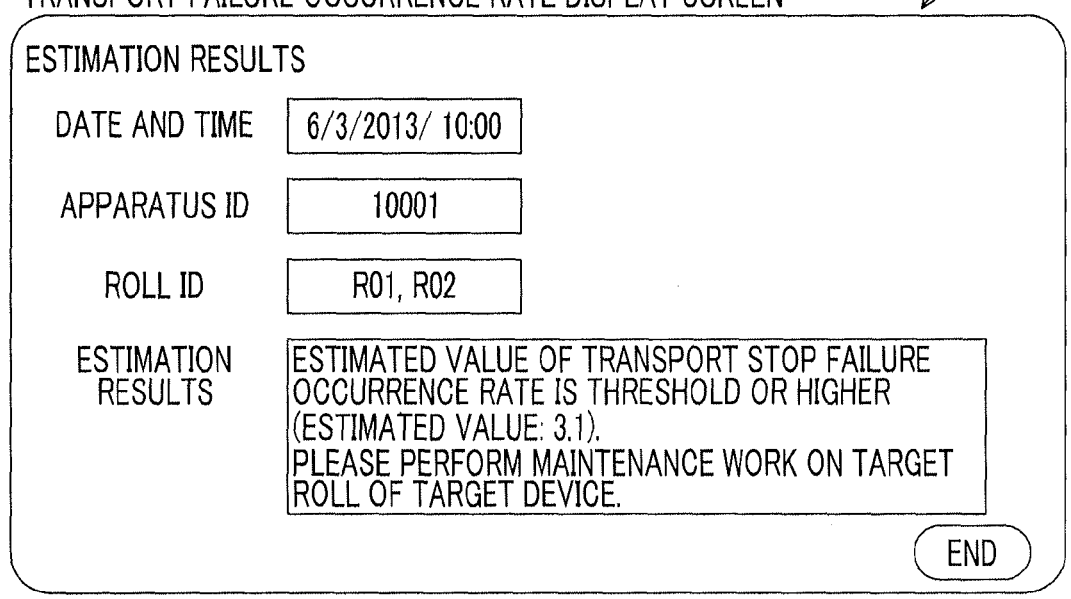
FIG. 13 is a schematic view showing an example of a transport failure occurrence rate display screen according to the exemplary embodiment.

In the next step S310, the CPU 350 displays the transport failure occurrence rate display screen that performs notification that at least one of the transport stop failure occurrence rate and the multiple feed occurrence rate reaches the threshold or higher on the display 358. FIG. 13 shows an example of a transport failure occurrence rate display screen according to the exemplary embodiment. As shown in FIG. 13, the date and time at which a notification has been performed, apparatus ID of the image forming apparatus 10 that is the notification target, and roll ID of the role that is the target of maintenance work are displayed on the transport failure occurrence rate display screen according to the exemplary embodiment. As shown in FIG. 13, the estimation results are also displayed using a character string and estimated value prepared in advance on transport failure occurrence rate display screen according to the exemplary embodiment. The roll ID of the roll that is the target of maintenance work indicates information for individually identifying the driving member positioned between the sensor pair corresponding to the estimation model for which the estimated value reaches the threshold or higher. The user designates the finish button displayed on the lower portion of the transport failure occurrence rate display screen using the keyboard 356 or the like in a case where the display of the transport failure occurrence rate display screen finishes.

Meanwhile, in a case of a negative determination in the processing in the step S308, the CPU 350 ends the present estimation processing program rather than executing the processing of the step S310.

Figure 14A:
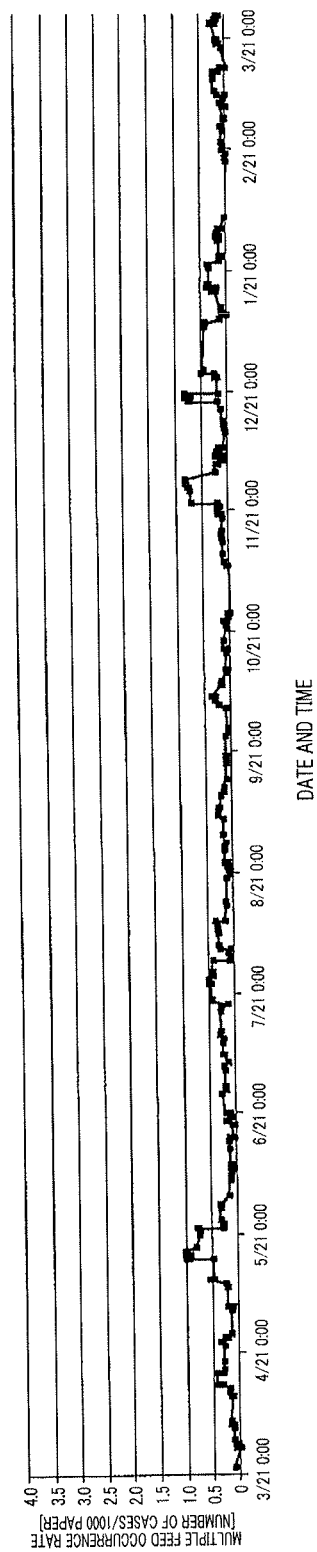
FIG. 14A is a graph showing an example of a transition of an estimated value of a multiple feed occurrence rate according to the exemplary embodiment.
Figure 14B:
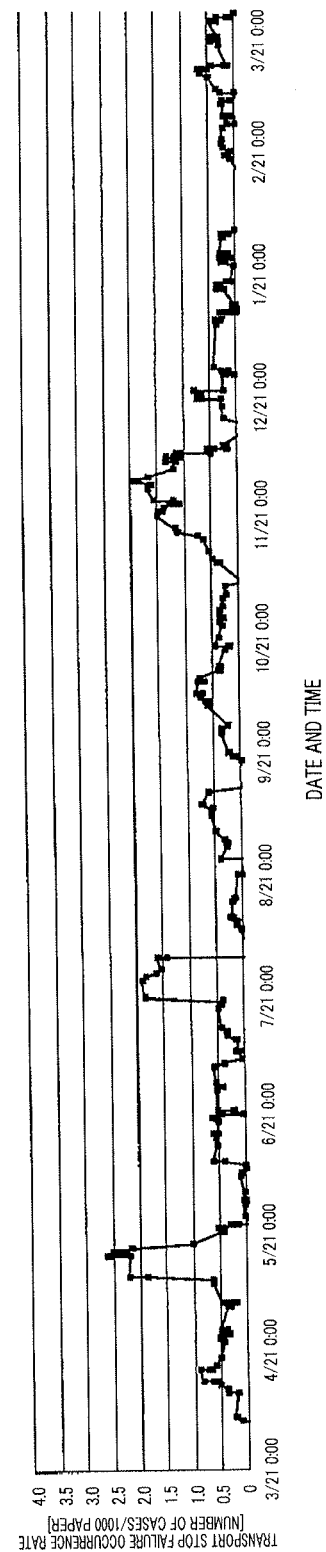
FIG. 14B is a graph showing an example of a transition of an estimated value of a transport stop failure occurrence rate according to the exemplary embodiment.

An example of the estimated value obtained by execution of the estimation processing program described above is shown in FIGS. 14A, 14B, 15A, and 15B. FIG. 14A is a graph showing time sequence data of the estimated value of the multiple feed occurrence rate and FIG. 14B is a graph showing time sequence data of the estimated value of the transport stop failure occurrence rate. Here, the vertical axis indicates the estimated value, and the horizontal axis indicates the date and time at which the estimation processing program is executed in both FIGS. 14A and 14B.

Figure 15A:
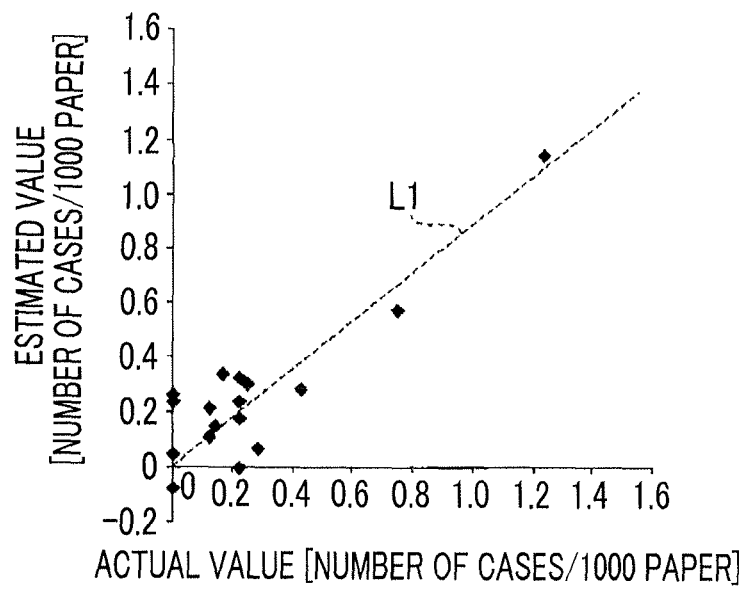
FIG. 15A is a scatter plot showing an example of an estimated value and an actual value of a multiple feed occurrence rate according to the exemplary embodiment.
Figure 15B:
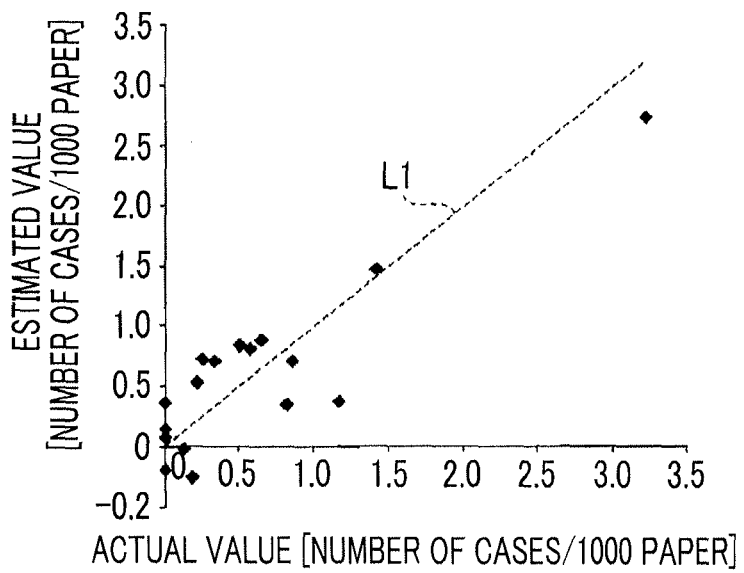
FIG. 15B is a scatter plot showing an example of an estimated value and an actual value of a transport stop failure occurrence rate according to the exemplary embodiment.

Meanwhile, FIG. 15A is a scatter plot showing the relationship between the estimated value and the actual value of the multiple feed occurrence rate, and FIG. 15B is a scatter plot showing the relationship between the estimated value and the actual value of the transport stop failure occurrence rate. Here, the vertical axis indicates the estimated value, and the horizontal axis indicates the actual value in both FIGS. 15A and 15B. FIGS. 15A and 15B indicate that the precision of the estimation increases as each estimated value approaches the straight line L1 having a slope of 1 and passing through the origin (0,0). Accordingly, either of FIGS. 15A and 15B indicates that the correlation between the estimated value and the actual value is comparatively high.

FIGS. 14A and 15A show the estimated value in a case where the dispersion value of the second transit time of the ordinary paper, the dispersion value of the second transit time of the coated paper, the average value of the first transit time of the ordinary paper, the average value of the first transit time of the coated paper, and the paper switching frequency are applied as the input information. FIGS. 14B and 15B show the estimated value in a case where the average value of the first transit time of the ordinary paper, dispersion value of the second transit time of the coated paper, the average value of the second transit time of the coated paper, the dispersion value of the second transit time of the ordinary paper, and the overprinting frequency are applied as the input information.

Although exemplary embodiments are described above, the technical scope of the invention is not limited to the scope disclosed in the exemplary embodiments. It is possible to add various modifications or improvements to the exemplary embodiment in a range not departing from the gist of the invention, and aspects to which such modifications or improvements are added are included in the technical scope of the invention.

The exemplary embodiments are not limited to the invention disclosed in the claims, there is no limitation that all combinations of characteristics described in the exemplary embodiments be essential to means for addressing the problem of the invention. Various steps of the invention are included in the above-described exemplary embodiment, and various inventions are extracted by combination of plural constituent features disclosed. Even if some constituent features are deleted from all of the constituent features disclosed in the exemplary embodiments, as long as the effects are obtained, it is possible for a configuration in which some of the constituent features are deleted to be extracted as the invention.

For example, in the exemplary embodiments, although a case is described where multiple regression analysis is applied as the method used in construction of the estimation model, the invention is not limited thereto. For example, an aspect in which another method of machine learning, such as a neural network, may be used as the method used in construction of the estimation model. The multiple regression analysis coefficient and the constant term may be adjustable by the user.

In the exemplary embodiments, although a case of constructing the estimation model for estimating the transport stop failure occurrence rate and the estimation model for estimating the multiple feed occurrence rate at the same timing is described, the invention is not limited thereto. For example, an aspect that constructs the estimation models at different timings may be used.

In the exemplary embodiment, although a case of constructing estimation models together for each of the characteristics (type) of paper P is described, an aspect of separately constructing the estimation model for each characteristic of the paper P may be used. In this case, an aspect in which the explanatory variable and the object variable are classified for each characteristic of the paper P, and the estimation models are each constructed using multiple regression analysis similarly to the exemplary embodiments is given as an example. An aspect in which the estimation model is constructed so that the transport failure occurrence rate that is the rate at which either of the transport stop failure and the multiple feed occurs is derived may be used.

The number of input information items given as an example in the exemplary embodiments is not limited to the number given in the exemplary embodiments as an example, and aspect in which the number is modified, as appropriate according to the estimation precision demanded, the processing capability of the estimation system 300 or the like may be used.

In the exemplary embodiment, although a case of performing analysis with the first analyzer 316 each time the paper transport information is acquired by the first acquisition unit 312 is described, the invention is not limited thereto. For example, an aspect that performs analysis by the first analyzer 316 for each period set in advance (as an example, 1 day) may be used.

In the exemplary embodiment, although a case is described where the paper transport information is stored in the storage unit 314 of the estimation apparatus 310, and the transport state characteristic amount is derived from the paper transport information by the estimation apparatus 310, the invention is not limited thereto. For example, an aspect in which the processing is performed by each of the image forming apparatuses 10 may be used.

In the exemplary embodiment, although a case is described where the paper transport information is stored in the storage unit 314 of the estimation apparatus 310, and the utilization information is derived from the paper transport information by the estimation apparatus 310, the invention is not limited thereto. For example, a mode in which the utilization information is acquired separately to the paper transport information may be used. In this case, for example, the image forming apparatus 10 records the date and time at which at least one of the type, basis weight, and size of the paper P is changed in the storage unit 256. The image forming apparatus 10 derives the paper switching frequency for each period T1, and transmits the paper switching frequency together with the derived date' and time thereof, model information, and apparatus ID to the estimation apparatus 310. Meanwhile, an aspect in which the estimation apparatus 310 stores the paper switching frequency received from the image forming apparatus 10 in correlated with the record of the transport state characteristic amount corresponding to the received date and time in the analysis information corresponding to the received model information is given as an example. Here, although a case in which the paper switching frequency is applied as the utilization information is described, it goes without saying that a case in which the overprinting frequency is applied is the same.

In the exemplary embodiment, although not specifically referenced, an aspect that derives the paper switching frequency by setting a weighting value according to the basis weight of the paper P and performing weighting in a case of deriving the paper switching frequency may be used. In this case, a first threshold (as an example, 80 $g/m^2$) is set in advance as a lower limit value of the normal basis weight of the paper P, and a second threshold (as an example, 200 $g/m^2$) larger than the first threshold is set in advance as an upper limit value of the normal basis weight of the paper P. An aspect in which weighting is performed by setting the weighting value for at least one of the number of times a paper P with the basis weight of the first threshold or lower is switched to and the number of times a paper P with a basis weight of the second threshold or higher is switched to is given as an example.

Specifically, for example, in a case of switching the basis weight of the paper P from 70 $g/m^2$ to 100 $g/m^2$, the number of switches is counted as 1. Meanwhile, for example, an aspect in which, in a case of switching the basis weight of the paper P from 100 $g/m^2$ to 70 $g/m^2$, the number of switches is counted as 1.5, and the paper switching frequency is derived is given as an example. In the exemplary embodiment, an aspect that sets a larger weighting value as the basis weight of the paper P decreases may be used, or an aspect that sets a larger weighting value as the basis weight of the paper P increases may be used. The first and second thresholds may be set based on the actual value of past printing or the actual value of the occurrence frequency of paper transport failures, or may be set by being input by a user via the keyboard 356 or the like.

In the exemplary embodiment, although a case in which each roll of the delivery roll 52, the transport roll 54, and the separation roll 56 are applied as the driving member of the invention is described, the invention is not limited thereto. For example, an aspect may be used in which a transport roll provided along the reversing path 194 is applied as the driving member. In the exemplary embodiment, an aspect may be used in which the number of duplex printing papers per unit printing number is applied as the utilization information.

In the exemplary embodiment, although a case is described in which the paper switching frequency and the overprinting frequency are applied as the utilization information, the invention is not limited thereto. For example, an aspect may be used in which the consumption rate of toner per number of papers of the unit printing is applied as the utilization information. An aspect may be used in which the fluctuation rate in the number of papers of printing is applied as the utilization information. In this case, an aspect is given as an example in which the dispersion value of the number of papers of printing for each period determined in advance is applied as the fluctuation amount of the number of papers of printing. An aspect may be used in which the value V obtained using the maximum number papers of printing MAXP for each period set in advance, the minimum number of paper of printing MINP, and the average number of papers of printing AVEP according to the following formula (3) is applied as the fluctuation value of the number of papers of printing.

Equation 2

$$V=(\text{MAX}P-\text{MIN}P)/AVEP \tag{3}$$

An aspect may be used in which at least one of the number of papers P with a basis weight of the first threshold or lower and the number of papers P of the second threshold or higher per unit printing number is applied as the utilization information.

An aspect may be used in which the presence of a member (a so-called air assist member) that supplements the paper feeding of the paper P by supplying air in a case where the paper P is fed from the paper accommodation unit 48 may be applied as the utilization information.

In the exemplary embodiment, although a case of deriving the paper switching frequency using the number times in which at least one of the type, basis weight, and size of the paper P is switched is described, the invention is not limited thereto. For example, an aspect may be used that derives the paper switching frequency using the number of times the paper ID is switched in a case where the image forming apparatus 10 is a model in which the paper ID that uniquely identifies the characteristics of the paper P is settable.

In the exemplary embodiment, although a case of performing notification that maintenance work is necessary is described, the invention is not limited thereto. For example, an aspect may be used that performs notification of information indicating a time period closer to the present point in time as the time period in which the maintenance work is necessary as the estimated value increases. In this case, an aspect is given as an example in which there is no notification in a case where the estimated value is less than a third threshold (as an example, 0.5), and a message that the maintenance work is necessary within two weeks is displayed on the display 358 as a transport failure occurrence rate display screen in a case where the estimated value is the third threshold or higher and lower than a fourth threshold (as an example, 1.5) larger than the third threshold. In this case, an aspect is given as an example where a message that the maintenance work is necessary within one week is displayed on the display 358 as the transport failure occurrence rate display screen in a case where the estimated value is the fourth threshold or higher.

In the exemplary embodiment, although a case where the occurrence rate (occurrence frequency) of the transport failures is estimated is described, the invention is not limited thereto. For example, the maintenance work necessity degree indicating the degree of necessity of maintenance work is classified as low in a case where the occurrence rate is lower than the third threshold, the maintenance work necessity degree is classified as medium in a case where the rate is the third threshold or higher and less than the fourth threshold, and the maintenance work necessity degree is classified as high in a case where the rate is the fourth threshold or higher. An aspect may be used in which the estimation model estimates if the input information is classified in any of the high, medium, or low classifications. In the exemplary embodiment, an aspect may be used that another machine learning method such as discrimination analysis according to Mahalanobis distance, a decision tree, multiple regression analysis, a Bayesian networks, and naive Bayes is applied as the method of constructing the estimation model.

Needless to say, the number or position of the timing sensors 57 shown in the exemplary embodiments is not limited to those shown in the exemplary embodiments, and may be changed, as appropriate, according to the estimation precision or the like demanded. Because the above-described second transit time is not derived in a case where there is one timing sensor 57, an aspect is given as an example that constructs the estimation model using the average value of the first transit time and the square root of the dispersion value as the transport state characteristic amount.

In the exemplary embodiment, although a case where the point in time at which feeding of the paper P from the paper accommodation unit 48 is started is applied as the origin of the detection in the first transit time, the invention is not limited thereto. For example, an aspect may be used in which another point in time set in advance, such as the point in time an image formation command is input from outside to the CPU 250 or the point in time a command to start transport of the paper P is output from the CPU 250, is applied as the origin point of detection in the first transit time.

In the exemplary embodiment, although a case of constructing the estimation model for each model of image forming apparatus is described, the invention is not limited thereto. For example, an aspect may be used in which the estimation model is constructed using different models. In this case, it is necessary to normalize the input information of the different models used in construction of the estimation model, such as making the arrangement positions of the timing sensors 57 into the same positions.

In the exemplary embodiment, although a case in which the transport state characteristic amount derived from the paper transport information of the M1 papers is applied as the input information of the estimation model is described, the invention is not limited thereto. For example, an aspect may be used in which paper transport information for one paper is acquired for each period (as an example, period in which an image is formed on five papers P) determined in advance, and the first and second transit times are applied instead of the transport state characteristic amount as the input information of the estimation model.

In the exemplary embodiment, although a case is described in which the estimation model is stored in the storage unit 314 of the estimation apparatus 310, the invention is not limited thereto. For example, an aspect may be used in which the estimation model is stored in a storage unit provided outside the estimation apparatus 310.

In the exemplary embodiment, a case is described where the transport state characteristic amount is derived for each type of paper P, the invention is not limited thereto. For example, an aspect may be used in which the basis weight of the paper P is divided into plural ranges (as an example, three ranges of 80 g/m² or less, more than 80 g/m² and less than 200 g/m² and 200 g/m² or higher), and the transport state characteristic amount is derived for each range. For example, an aspect may be used in which the size of the paper P is divided into plural ranges and the transport state characteristic amount is derived for each range.

In the exemplary embodiment, although a case is described in which the image forming apparatus is applied as the estimation target of the transport failure information, the invention is not limited thereto. For example, an aspect may be used in which another apparatus having a driving member driving in order that the paper of an image reading apparatus be transported is applied as the estimation target of the transport failure information.

Additionally, the configurations of the estimation system 300, the image forming apparatus 10, and the estimation apparatus 310 (refer to FIGS. 1 to 6) described in the exemplary embodiments are examples, and it goes without saying that unnecessary parts may be deleted and new parts added within a range not departing from the gist of the invention.

The processing flow of the various programs (refer to FIGS. 10 to 12) described in the exemplary embodiments are also examples, and it goes without saying that unnecessary steps may be deleted, new steps added, or the processing order switched within a range not departing from the gist of the invention.

The configuration (refer to FIG. 13) of the transport failure occurrence rate display screen shown in the exemplary embodiments is also an example, and it goes without saying that it is possible to delete a part of the information, add new information, or change the display position within a range not departing from the gist of the invention.

The configuration (refer to FIGS. 7 to 9) of each item of information shown in the exemplary embodiments is also an example, and it goes without saying that it is possible to delete a portion of the information, add new information, or switch the storage position within a range not departing from the gist of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An estimation apparatus comprising:
a storage unit that stores an estimation model for estimating transport failure information pertaining to a transport failure based on information pertaining to a transit time in which each of a plurality of papers with different characteristics passes through a certain transport section in a transport path and information pertaining to a utilization of each of the plurality of papers for each of a plurality of image processing apparatuses;
an acquisition unit that acquires the characteristics of the paper, information pertaining to the transit time of the paper, and information pertaining to the utilization of the paper for the image processing apparatus that is the estimation target; and
an estimation unit that estimates the transport failure information using the estimation model based on the acquisition results of the acquisition unit,
wherein the information pertaining to the utilization includes at least one of a switching frequency of the paper having different characteristics and a frequency of overprinting processes that forms another image on the paper on which an image is formed,
wherein the characteristics include a basis weight of the paper, and
the estimation unit performs weighting by setting a weighting value according to the basis weight for the switching frequency of the paper, to perform the estimation.

2. The estimation apparatus according to claim 1,
wherein the information pertaining to the transit time is an average value and a standard deviation of a time required for the paper to transit the transport section.

3. The estimation apparatus according to claim 1,
wherein the transport failure information is an occurrence frequency of transport failures of the paper.

4. The estimation apparatus according to claim 1,
wherein the estimation model is constructed in advance for each model of the image processing apparatus.

5. The estimation apparatus according to claim 1,
wherein a plurality of transport sections are provided,
the estimation model is constructed for each of the plurality of transport sections,
the acquisition unit acquires information for each of the plurality of transport sections, and
the estimation unit estimates the transport failure information for each of the plurality of transport sections.

6. The estimation apparatus according to claim 1, further comprising:
a notification unit that performs notification of a necessity for maintenance work based on the transport failure information.

7. The estimation apparatus according to claim 6,
wherein the notification unit performs the notification with raising the necessity for maintenance work as degree of failure indicated by the transport failure information increases.

8. An estimation apparatus comprising:
a storage unit that stores an estimation model for estimating transport failure information pertaining to a transport failure based on information pertaining to a transit time in which each of a plurality of papers with different characteristics passes through a certain transport section in a transport path and information pertaining to a utilization of each of the plurality of papers for each of a plurality of image processing apparatuses;
an acquisition unit that acquires the characteristics of the paper, information pertaining to the transit time of the paper, and information pertaining to the utilization of the paper for the image processing apparatus that is the estimation target; and
an estimation unit that estimates the transport failure information using the estimation model based on the acquisition results of the acquisition unit,
wherein a plurality of transport sections are provided,
the estimation model is constructed for each of the plurality of transport sections,
the acquisition unit acquires information for each of the plurality of transport sections, and
the estimation unit estimates the transport failure information for each of the plurality of transport sections.

* * * * *